June 18, 1935.  H. J. RICKWOOD  2,005,350
CENTRIFUGAL CLUTCH
Filed Sept. 17, 1932   5 Sheets-Sheet 1

Fig.1.

June 18, 1935.  H. J. RICKWOOD  2,005,350
CENTRIFUGAL CLUTCH
Filed Sept. 17, 1932   5 Sheets-Sheet 3

June 18, 1935.  H. J. RICKWOOD  2,005,350
CENTRIFUGAL CLUTCH
Filed Sept. 17, 1932  5 Sheets-Sheet 4

Fig.6.

Inventor:
Henry John Rickwood
By Byrnes, Stebbins, Parmelee
& Blenko
Attys.

Patented June 18, 1935

2,005,350

UNITED STATES PATENT OFFICE 2,005,350

CENTRIFUGAL CLUTCH

Henry John Rickwood, Croydon, England, assignor to Trojan Limited, Croydon, England, a British company Application September 17, 1932, Serial No. 633,655
In Great Britain September 25, 1931

9 Claims. (Cl. 192—105)

This invention relates to centrifugal clutches and like mechanism (e. g. brake mechanism) in which contact between co-operating engaging surfaces (e. g. frictional contact surfaces) is controlled by a member which is rotatable and is likewise movable radially outwards under the influence of centrifugal force. In centrifugal clutches the engaging surfaces are normally brought into contact by centrifugal force acting either directly on movable shoes attached to the driving member and forming one of the frictional surfaces, or else by the same force acting on a bob weight connected through a system of levers to the aforesaid movable shoes or to a frictional band. In either case a spring is employed as the restraining force keeping the frictional surfaces out of contact when the driving member is either stationary or rotating below a predetermined speed.

Considering the case in which a bob weight is employed, the engagement of the clutch is dependent on the outward radial movement of the bob weight. Since centrifugal force is proportional to the square of the speed of rotation multiplied by the radial distance of the weight from the centre of rotation then, in the case where the spring exerts a restraining force directly proportional to its extension and such extension varies in direct proportion to the radial distance of the weight from the centre of rotation, the amount of the outward radial movement of the weight will be a function of the square of the speed. It will thus be seen that a small increase in speed will result in full engagement of the clutch, with the consequent shock to the mechanism and that when the speed is diminishing disengagement of the clutch will take place at substantially the same speed at which engagement took place.

One object of the present invention is to provide improved means for controlling the speed at which engagement and disengagement of the co-operating members of the clutch will take place. More specifically it is an object of the invention to provide an improved control device operable in such manner that disengagement of the clutch will take place at a substantially lower speed than that at which engagement is made.

The present invention is concerned with a centrifugal clutch of the type in which there is combined with a main control spring for the centrifugal member arranged to impose on its outward movement a resistance which increases approximately in direct proportion to the increase in radius at which the centrifugal member rotates, an auxiliary resilient control arranged to impose, up to a point, an additional restraint on the outward movement of the centrifugal member, and after said point to assist said outward movement, said auxiliary control acting vice versa on inward movement of the centrifugal member.

The present invention provides a centrifugal clutch of the types described above in which the auxiliary resilient control comprises the combination of a cam and a spring-loaded cam follower bearing on the operative surface of the cam, one of these members (say the cam) being so operatively coupled with the centrifugal member that on movement of the latter towards and away from the axis of rotation a to and fro movement will be imparted to that member (e. g. the cam) in relation to the counterpart member (e. g. the follower). Conveniently, the cam is formed on or carried by the centrifugal member.

Preferably the spring controlled cam has its operative surface so arranged as first to impose on the outward movement of the centrifugal member a resistance which increases at a substantially greater rate than is approximately proportional to the increase in the radius at which the centrifugal member rotates and thereafter (i. e. when the dead centre of the cam is passed) to assist the outward movement of the centrifugal member, the cam acting vice versa on inward movement of the centrifugal member.

Preferably also the cam of the auxiliary resilient control has its dead centre so located as to be effective at on near the point at which contact is first made between the engaging surfaces of the clutch mechanism.

In one construction according to the invention, there is a plurality of bob weights, and the auxiliary resilient control comprises a floating member rotatable bodily with the driving element of the clutch, but capable of angular shift in relation thereto, the bob weights being coupled to the floating member so as automatically to impart to it angular shift as aforesaid on outward or inward movement of the weights, and the cam on which the auxiliary control spring operates, is formed on this floating member. The coupling between the bob weights and the floating member may be formed by links, or in another arrangement, a tooth-and-slot connection is employed. For the purpose of controlling the engaging and disengaging movement of the clutch parts, the bob weights may be connected to the driving element of the clutch by screw-threaded couplings arranged to impart an axial shift to the bob weights when they move radially under centrifugal action, the clutch parts being so arranged that their engagement is controlled by the aforesaid axial shift of the bob weights.

Another feature of the invention resides in the provision of double-acting springs, whereof each is arranged to impose both the main resilient control and the auxiliary control. For example, each spring may comprise two plungers, actuated by the same spring, and arranged one to act unidirectionally on the bob weight to resist its outward movement, and the other to act on the snap-over cam which is movable by the bob weight.

The foregoing and other features of the invention are embodied in four examples which will now be described with reference to the accompanying drawings, in which.

Figure 1:
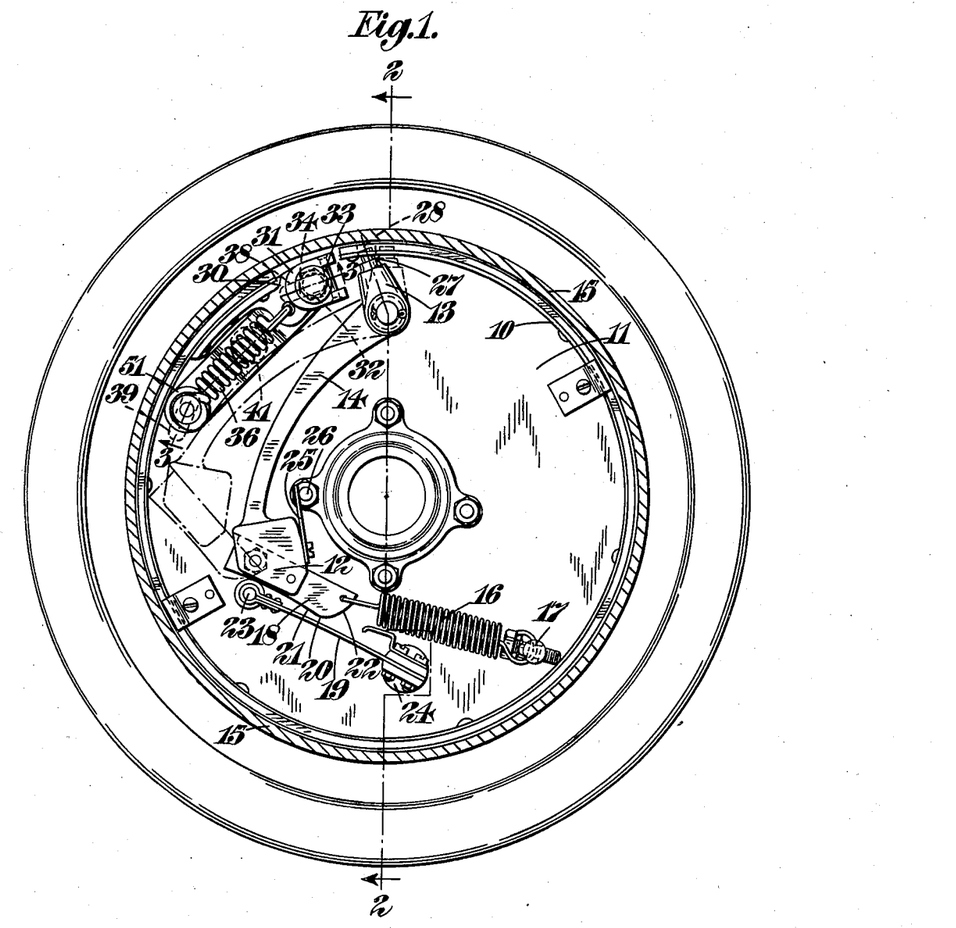
Figure 1 is a front view of the clutch according to the first example.
Figure 2:
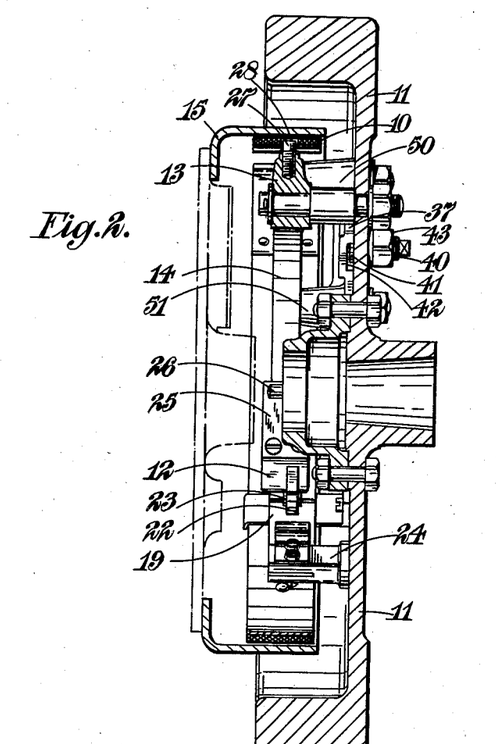
Figure 2 is a cross-section on the line 2—2 in Figure 1.

In the first example the invention is applied to an automatic centrifugal clutch (to be used for example in conjunction with a change speed gear in a motor car or in conjunction with electric or other power driven mechanisms) in which a frictional band 10 carried by and rotatable with a driving member 11 is expanded and contracted (to effect engagement and disengagement of the clutch) by the movement of a bob weight 12 under the influence of centrifugal force. The frictional band 10 is anchored at one end in an adjustable mounting in a manner which will be hereinafter described, and at the other end is coupled to one arm 13 of a bell crank lever whereof the other arm 14 carries the bob weight 12, the arrangement being such that as the bob weight moves outwardly the band will be expanded into frictional engagement with a co-operating clutch drum 15, and vice versa. The main resilient control for the bob weight comprises a tension spring 16 arranged to impose on the outward movement of the bob weight a resistance which increases approximately in direct proportion with the increase in radius at which the bob weight rotates. The spring 16 is connected at one end to the bob weight and at the other is adjustably secured to a pillar 17 attached to the driving member 11. The auxiliary resilient control, furnished by the invention, comprises a cam 18 which is formed on or carried by the bob weight, combined with a blade spring 19 which is at one end anchored to a pillar 24 secured to the driving member 11 and at the other presses on the cam. This cam and its co-operating spring are arranged to constitute a snap-over device with a dead centre 20 so located as to be effective at or near the point at which the frictional band 10 will be brought into engagement with the co-operating member 15 of the clutch. The cam is formed with opposed ramp surfaces 21, 22, and during the initial outward movement of the bob weight the end of the cam control spring, which has secured to it a ball or roller 23, will ride up the ramp surface 21, imposing an additional resistance against outward movement of the bob weight. After the dead centre 20 has been passed the cam control spring will bear on the other ramp surface 22, exerting its force in a direction such as to assist, instead of restrain, further outward movement of the bob weight.

The extent to which the bob weight can be pulled inwardly by the main control spring 16 is limited by a stop 25 carried by the bob weight and co-operating with a bolt 26 extending outwardly from the driving member. The positions which the bob weight 21 and the lever 13, 14 assume when the clutch is brought into engagement are indicated by chain lines in Figure 1. As will be seen the engagement between the arm 13 of the lever 13, 14 and the frictional band 10 is made by a pin 27 formed at the end of the arm 13 and engaging a slot 28 in the brake band.

It will be appreciated that by varying the form of the cam 18 and adjusting the strength of its control spring 19, any desired graduation in the engagement of the clutch can be effected. When the cam control spring is exerting an outward force, the clutch will remain in engagement while the speed of rotation is being reduced. The speed at which disengagement will take place will, of course, depend upon the restoring force exerted by the main control spring 16 in relation to the outward force exerted by the auxiliary spring 19. With an arrangement of this kind the speed of rotation corresponding to disengagement of the clutch will be substantially lower than the speed at which engagement takes place.

In order further to reduce any shock caused by sudden engagement of the clutch, the normally anchored end of the frictional band, instead of being rigidly secured to the driving member 11 is coupled thereto by a spring-controlled lost motion device, of the following construction. The aforesaid end of the frictional band has riveted to it or otherwise securely attached to it a bracket 30. The bracket 30 has a U-shaped extremity 31 which embraces a spindle 32 which in turn is bolted to the driving member 11. The U-shaped end 31 is located on the spindle by means of a cross pin 33 so positioned as to permit between the bracket 30 and the spindle 32 a small amount of lost motion represented by the gap 34 shown in Figure 3. Spaced apart from the spindle 32 a second spindle 35 is bolted to the driving member and a strong tension spring 36 is anchored at one end to the top of the spindle 35 and at the opposite end engages the bracket 30. It will be appreciated that when, on outward movement of the bob weight, the lever arm forces the adjacent end of the frictional band in a clockwise direction (considered with reference to Figure 1), the opposite end of the band connected to the bracket 30 will tend to follow in the same direction. The lost motion device described above permits a small movement, that is through the gap 34, to take place against the action of the spring 36, and after this gap has been taken up the end of the frictional band connected to the bracket 30 is then rigidly anchored by the spindle 32.

Figure 3:
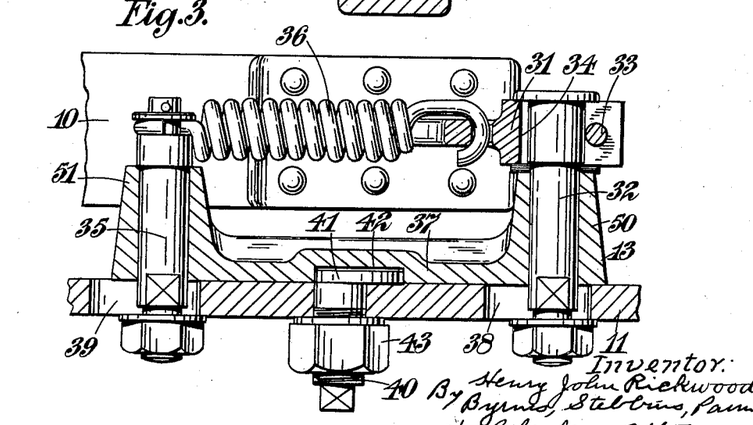
Figure 3 is a cross-section on a larger scale on the line 3—3 in Figure 1, showing the anchorage for the friction band.

In order to provide for an adjustment of the initial setting of the anchored end of the frictional band, the following arrangement is adopted. The two parallel spindles 32 and 35, are located in sleeves 50, 51 formed integrally with a connecting piece 37 which is slidably mounted on the inner face of the driving member 11. The spindles 32 and 35 extend respectively through slots 38 and 39 in the driving member, these two slots being obtusely inclined to one another. This arrangement permits of a certain degree of circumferential adjustment of the whole mounting comprising the sleeves 50, 51 with their associated spindles 32 and 35 and the connecting piece 37. In order that such adjustment may readily be made a bolt 40 is arranged to extend through an aperture in the driving member and to carry at its inner end an eccentric plate 41 located in a groove 42 on the underside of the connecting piece 37. By rotation of the bolt 40, it will be seen that through the medium of the eccentric plate 41 the spindle mounting can readily be adjusted. A nut 43 is provided for the purpose of locking the spindle mounting in any desired position of adjustment. The obtuse setting of the slots 38, 39, is for the purpose of ensuring that in circumferential adjustment of the anchorage there will be no radial shift of either end of it. It will be appreciated that the real point is to have each slot extending in a line parallel with a tangent to the surface of the brake drum at the particular location concerned.

Figures 4, 5:
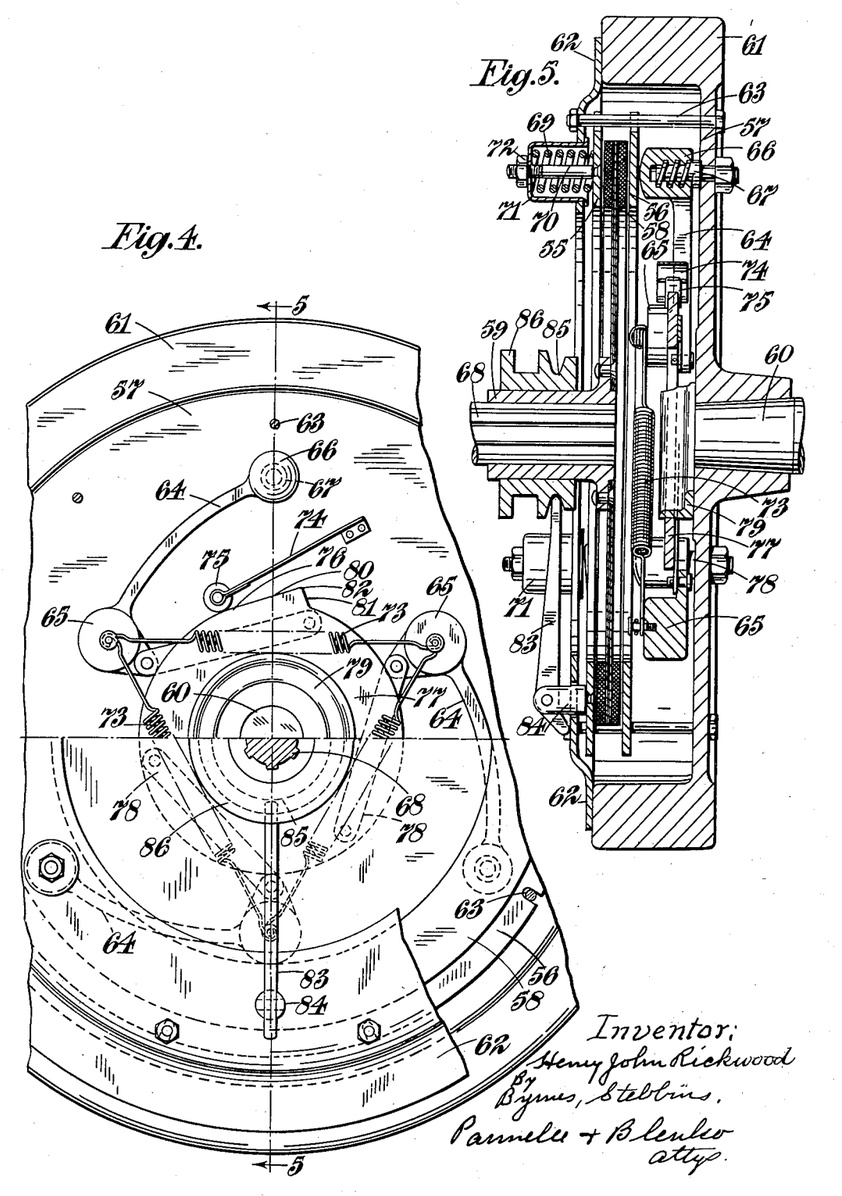
Figure 4 is a front view of the clutch embodying the second example.
Figure 5 is a cross-section on the line 5—5 in Figure 4.

In the second example illustrated in Figures 4 and 5, the invention is applied to a clutch of the friction-disc type in which engagement and disengagement are effected by axial sliding movement of one clutch part in relation to another. The clutch parts are in this example constituted by two friction discs 55, 56 which are rotatable with, but slidable axially in relation to, a carrier plate 57 mounted on a driving shaft 60. The discs 55, 56 are spaced apart, and there is located between them a friction disc 58 carried by a driven member 59. The driven disc 58 is provided, as shown, with two opposed friction faces for engagement respectively with the two driving discs 55, 56. The carrier plate 57 which serves as a mounting for the clutch mechanism, is provided with a flange 61 which, together with an annulus 62, serves to enclose the clutch mechanism. The annulus 62 is held to the carrier plate 57 by bolts 63 which also serve as guides for the two friction discs 55, 56.

The centrifugal member comprises three arms 64 each of which carries a bob weight 65 at one end, and at the other end is formed with a boss 66 pivotally mounted on a stud 67 attached to the carrier plate. The studs 67 are screw-threaded and the bosses 66 are bored out and formed with internal screw-threads for engagement with the studs, the arrangement being such that on outward movement of each bob weight under centrifugal force, the corresponding boss at the inner end of the bob weight arm will partake of a "screwing off" movement in relation to the corresponding stud. When, therefore, the bob weights move radially outwards under centrifugal force, they (and the arms which carry them) will also shift axially in a direction away from the carrier plate 57 and towards the friction disc 56. The bosses are located side by side with the disc 56 so that when they are moved axially as aforesaid, they will engage the disc and move it with them into engagement with the co-operating face of the friction disc 58 carried by the driven member.

The driven member 59 carrying the driven disc 58 is so mounted on the driven shaft 68 that while it is rotatable with it, it is free to move axially within limits, in relation to it. The first action of the bob weights on their outward radial movement accompanied by a corresponding axial shift, is to cause engagement between the driving disc 56 and the driven disc 58. On further outward movement of the bob weights, the driven disc 58 is moved into engagement with the other driving disc 55 which is pressed by springs 69 in a direction towards the driven disc 58. Axial movement of the disc 55 in a direction towards the disc 58 is limited by stops comprising studs 70 secured to the disc 55 and encircled by the springs 69. The studs 70 pass out through apertures in casings 71 which surround the springs and at the outer ends, are engaged by nuts 72. In the limiting position of the disc 55 in its approach towards the driven disc 58—shown in Figure 5—the nuts 72 abutting on the casings 71 act as the stops aforesaid to prevent further approach. When the driven disc 58 has been shifted axially sufficient to engage and move the disc 55 axially (i. e. towards the lip in Figure 5), the springs 69 come into action to effect a resilient clamping of the driven disc 58 between the opposed faces of the two driving discs 55, 56.

The main resilient control for the bob weights comprises three tension springs 73 which interconnect the bob weights in the manner shown in Figure 4. The auxiliary resilient control for the bob weights is furnished by a leaf spring 74 anchored at one end to the carrier plate 57 and at the other end carrying a roller 75 (constituting a cam follower) bearing on a cam 76 which in turn is formed on a ring 77 to which each of the bob weights is connected by a link 78. Each of the links 78 is pivotally connected at opposite ends to the bob weight 65, and the ring 77 respectively. The ring 77 is mounted on a circular bracket 79 attached to the carrier plate 57, the ring being free to move angularly upon the bracket and also to shift axially thereon. The bob weights and their carrying arms, together with the springs 73, links 78 and ring 77 all constitute a single unit which is movable as such in an axial direction, as well as being bodily rotatable with the driving member 57. When the bob weights move radially outwards under centrifugal force, they impart, by means of the links 78 an angular movement to the ring 77. This angular movement is controlled by the spring pressed roller 75 bearing on the cam 76 formed with a ring. The cam 76 is formed with two opposed ramp surfaces 80, 81 and during the initial outward radial movement of the bob weights, the roller 75 will ride up the ramp surface 80 and will thus impose an additional resistance against outward movement of the bob weights. After the dead centre 82 has been has been passed, the auxiliary spring 74 acting through the roller 75, will bear on the other ramp surface 81 exerting its force in a direction to increase angular movement of the ring 77 in a counterclockwise direction, that is to say, to assist further outward movement of the bob weights. As in the previous example, the spring 74 and the cam 76 constitute a snap-over device, whereof the dead centre 82 is so located as to be effective at or near the point at which the driving and driven clutch parts are brought into engagement.

The outer friction disc 55 on the driving member has associated with it a manually operable control device, whereby disengagement of the clutch can be effected by hand if desired. This control device comprises one or more bell-crank levers 83, each of which is pivotally connected between its ends to a bracket 84 secured to the friction disc 55 and extending through an aperture in the annulus 62. The long arm of the bell-crank lever engages a circular groove 85 on a collar 86 which is mounted on the driven member 59 so as to be movable axially with respect thereto. The short arm of the lever takes a bearing on the annulus 62 so that when the collar is moved to the left in Figure 5, the lever will operate to withdraw the disc 55 from engagement.

Figure 6:
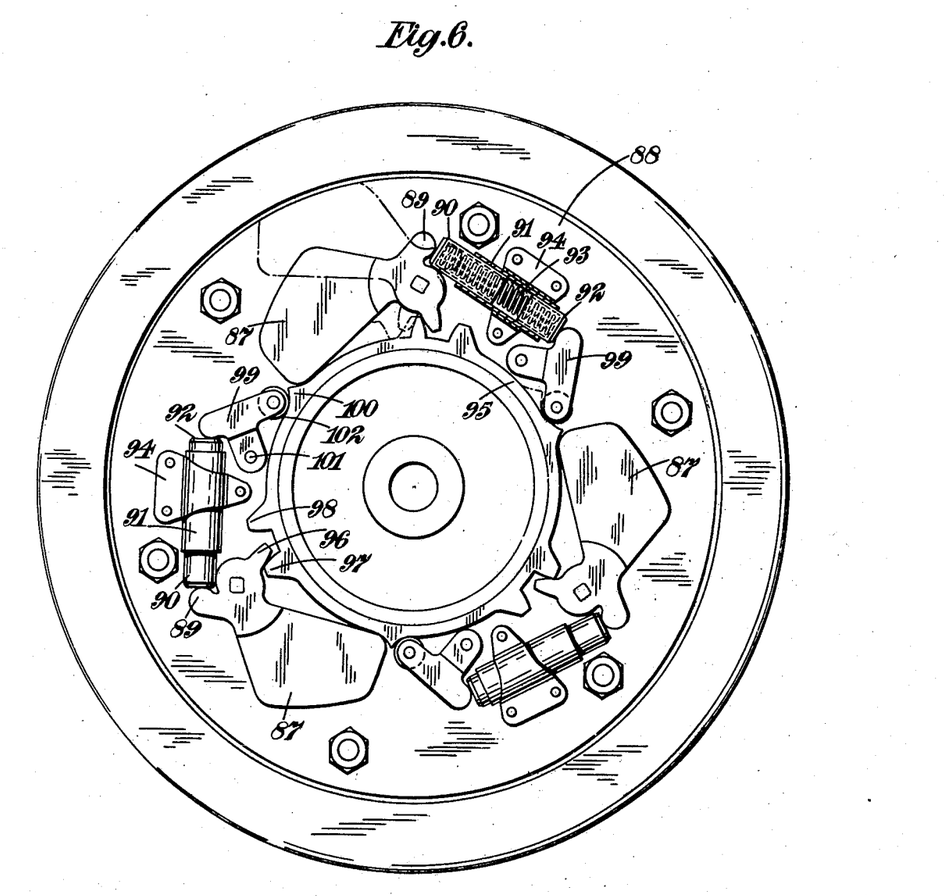
Figure 6 is a front view of a clutch according to the third example.

In the third example, shown in Figure 6, the centrifugal member comprises a plurality of bob weights 87—three in the particular case illustrated—each of which is pivotally mounted on a carrier plate 88 rotatable with the driving member. The centrifugal member in this case operates in conjunction with the clutch shown in Figure 5. According to the special feature of the invention embodied in this example, the main resilient control and the auxiliary resilient control for the bob weights are provided by one and the same set of springs. To provide the main resilient control, each bob weight is formed with a lug 89 arranged to engage a spring pressed plunger 90 which resists outward movement of the weight. The spring pressed plunger 90 operates in one end of a casing 91, in the other end of which is another spring pressed plunger 92 which is arranged to impose the auxiliary resilient control on the bob weight. The two plungers 90, 92, are resiliently controlled by the same spring 93 located within the casing 91 which is attached by a bracket 94 to the carrier plate 88.

The auxiliary control plunger 92 imposes its control in the following way. A ring 95 mounted co-axially with the carrier plate 88 is arranged to rotate bodily with the carrier plate and is also free to shift angularly in relation to that plate. In the second example (Figures 4, 5) the bob weights are connected by links to the equivalent of the ring 95; in this example, there is a toothed connection between the two. As shown in Figure 6, each bob weight is formed opposite the lug 89 with a tooth 96 which is arranged to engage in the space between two teeth 97, 98 formed on the periphery of the ring 95. On initial outward movement of the bob weights, the teeth 96 on the weights engage with the teeth 97 on the ring, and the latter is moved angularly in relation to the carrier plate (in a counterclockwise direction in Figure 6. This angular movement of the ring is resisted (in addition to the resistance of the plungers 90 acting on the lugs 89) by the spring pressed plungers 92 acting through pivotally mounted cam-followers 99 on cams 100 formed on the periphery of the ring. Each of the cam followers 99 is a T-shaped piece which is pivoted at the bottom of the leg 101 to the carrier plate, has one end of the cross-bar of the T bearing on the spring-pressed plunger 92, and at the other end of the cross-bar carries a roller 102, co-operating with the cam 100. As before each cam 100 is formed with two opposed ramp surfaces, and during the initial outward radial movement of the bob weights, the spring controlled cam followers resist said outer movement, while after dead centre is passed, they assist that movement. As will be seen from Figure 6, there is a certain degree of lost motion provided in the toothed connection between each bob weight and the ring 95, so that after the cam followers pass the dead centres of the cams, this lost motion has to be taken up before the teeth 98 on the ring come into contact with the teeth 96 on the bob weights.

In this example the radial movement of the bob weights can be utilized to effect axial sliding movement of a clutch disc in substantially the same manner as illustrated in Figure 5, that is to say, the bob weights may be pivotally mounted on the carrier plate by means of screw-threaded bosses engaging screw-threaded studs attached to the plate.

Figures 7, 8, 9, 10:
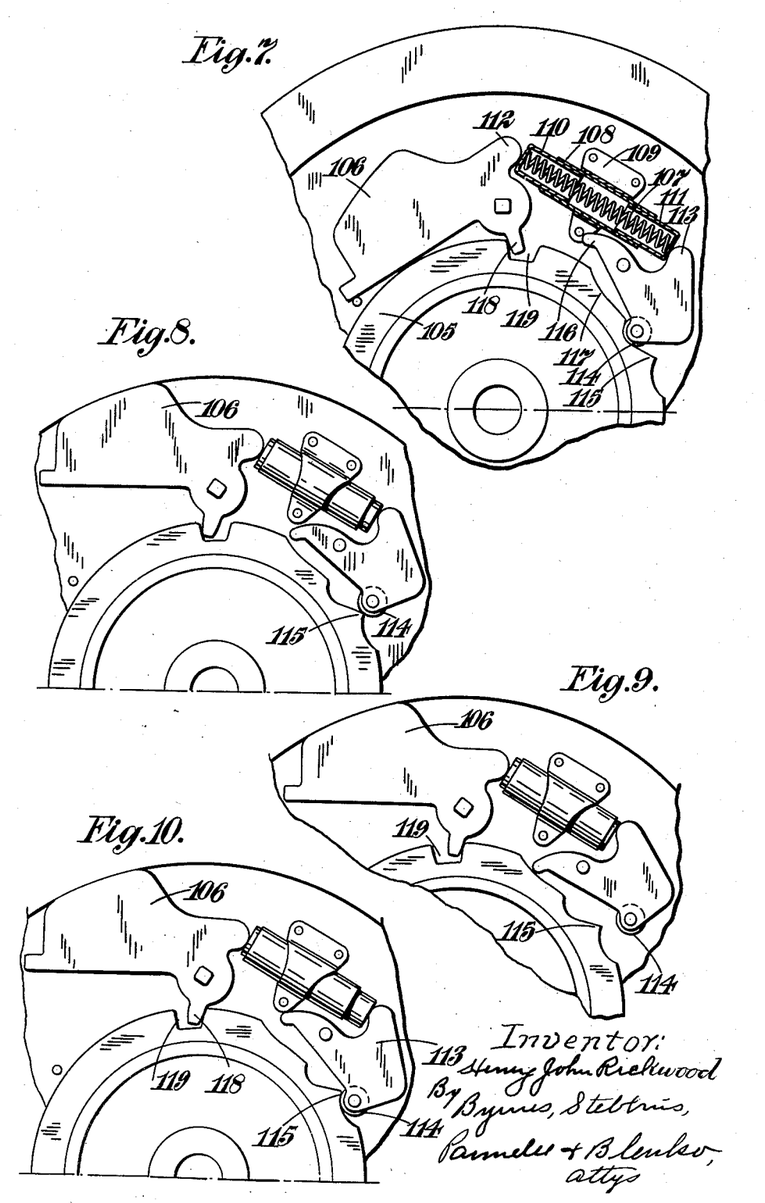
Figures 7 to 10 are views of the clutch according to the fourth example, showing the successive positions occupied by the parts during operation of the clutch.

In the fourth example of the invention, illustrated in Figures 7, 8, 9 and 10, there is again a floating ring or disc 105 with which the bob weights 106 are arranged to make a toothed connection, and again the mechanism is arranged to operate in conjunction with the clutch shown in Figure 5. As in the third example, the main and the auxiliary resilient control in respect of each bob weight is imposed by a single spring 107, located within a casing 108 attached to a carrier plate 109 on the driving member, and acting on two spring pressed plungers 110, 111, the former of which imposes the main control, and the latter the auxiliary control. The main central plunger 110 acts on a lug 112 formed on the bob weight, and the plunger 111 acts on one arm of a lever 113 pivotally mounted on the carrier plate 109 and having the other arm fitted with a roller 114 co-operating with a cam 115 on the periphery of the ring. There is, as before, a certain degree of lost motion in the toothed connection between the bob weights and the ring 105. This example introduces the additional feature that the lever 113 by which the auxiliary control is imposed, is in the form of a weighted member or auxiliary bob weight which is likewise under the influence of centrifugal force. Moreover, each lever 113 carries an extended arm 116 which is arranged to co-operate with a portion 117 on the periphery of the ring to form a trip device to take up the lost motion between the bob weight teeth 118 and the tooth spaces 119 in the ring when a predetermined speed has been reached. The apparatus operates in the following way, which is clearly indicated by the successive positions of the parts shown in Figures 7 to 10:

When a predetermined speed of transmission (in the region of the normal speed at which full engagement of the clutch takes place) has been reached, the parts assume the position shown in Figure 8 in which the bob weights are at the limit of their possible outward travel. In this position as shown, the rollers 114 have not quite reached the dead centre of the cam 115. On a further increase in speed of the transmission the levers 113 responding to centrifugal force move outwardly, compressing the springs 111 still further, and carrying the rollers 114 clear of the surface of the ring. During this further outward movement of the levers 113 the aforesaid trip device comes into operation, each arm 116 riding down the inclined portion 117 of the periphery of the ring and so imparting a further angular shift to the ring sufficient to take up the lost motion between the bob weight teeth 118 and the tooth spaces 119 in the ring. This position of the mechanism is shown in Figure 9. When the speed of the transmission diminishes, the levers 113 move backwardly towards the ring (as the result of the diminished centrifugal force acting on them) and the rollers 114 come into contact with the reverse ramp surfaces on the ring cams 115. This position is illustrated in Figure 10. The parts will continue in this position until the speed has so far diminished that the leverage on the ring exerted through the spring plungers 110 and the teeth 118 exceeds that exerted in the reverse direction on the ring by the plunger 111 acting on the rollers 114. The parts will then move towards the position illustrated in Figure 7. It will be appreciated that disengagement of the clutch will take place at a very much lower speed than that at which engagement is made.

In the example illustrated in Figure 6, lost motion is provided in the connection between the bob weights and the floating ring in order that the clutch will be smooth in its action. The mechanism described with reference to Figures 7 to 10 is designed so as to avoid any jar which might otherwise take place in the taking up of the lost motion between the bob weight teeth and the floating ring.

Preferably, in each of the examples described herein, the main and auxiliary spring controls are so arranged, that while the main control is arranged to impose a resistance which increases approximately in direct proportion to the increase in radius at which the bob weights operate, the auxiliary control is arranged to impose, up to the dead centre of the cam mechanism, an additional restraint on the outward movement of the bob weights which increases at a substantially greater rate than is approximately directly proportional to the increase in radius at which the bob weights rotate.

I claim:—

1. A centrifugal clutch comprising in combination rotatable driving and driven elements, cooperating clutch parts associated respectively with the driving and driven elements, a centrifugal member rotatable with the driving element and movable under centrifugal force away from and towards the axis of rotation, means operable automatically by movement of the centrifugal member as aforesaid to effect relative sliding movement between the clutch parts in a direction parallel with the axis of rotation, a main spring control for the centrifugal member arranged to act uni-directionally to resist outward movement of said member, and an auxiliary resilient control arranged to act first in one direction to resist outward movement of the centrifugal member and then in the opposite direction, said auxiliary control comprising a snap-over cam and a spring-loaded cam follower, one of which parts is movable by the centrifugal member and the other relatively fixed.

2. In an automatically acting centrifugal clutch in which engagement and disengagement of the clutch parts is effected by a rotatable member under the influence of centrifugal force, the combination of a plurality of control springs each of which is double acting and arranged to impose a main control acting uni-directionally to resist outward movement of the centrifugal member, and also an auxiliary control acting first in one direction to resist outward movement of the centrifugal member and then in the opposite direction, said auxiliary control comprising a snap-over cam movable by the centrifugal member, and a cam-follower loaded by the spring aforesaid.

3. In a centrifugal clutch the combination of a centrifugally influenced rotatable member, a main resilient control for said member acting uni-directionally to impose on its outward movement a resistance increasing approximately in direct proportion to the increase in radius at which said member rotates, and an auxiliary resilient control for the centrifugal member comprising a snap-over cam, and a spring-loaded cam follower, one of which parts is movable by the centrifugal member and the other relatively fixed, the cam being so constructed as first to impose on the outward movement of the centrifugal member, a resistance which increases at a substantially greater rate than is approximately directly proportional to the increase in radius at which the centrifugal member rotates, and thereafter when the dead centre of the cam is passed to assist centrifugal force acting outwardly on the centrifugal member, the cam acting vice versa on inward movement of the centrifugal member.

4. In a centrifugal clutch the combination of a rotatable centrifugally-influenced member, a main resilient control acting uni-directionally to impose on outward movement of said member a resistance which increases approximately in direct proportion to the increase in radius at which said member rotates, and an auxiliary resilient control for the centrifugal member comprising a snap-over cam and a spring-loaded cam follower, one of which parts is movable by the centrifugal member and the other relatively fixed, the cam being so constructed as first to impose on the outward movement of the centrifugal member a resistance which increases at a substantially greater rate than is approximately directly proportional to the increase in radius at which the centrifugal member rotates, to continue such action until contact is made between the engaging surface of the clutch parts, and thereafter to assist centrifugal force acting outwardly on the centrifugal member, the cam acting vice versa on inward movement of the centrifugal member.

5. In a centrifugal clutch of the type described, the combination of a rotatable driving element, a plurality of centrifugally-influenced bob weights rotatable with the driving element, a main resilient control for the bob weights comprising springs interconnecting said weights and arranged to resist outward movement of them, and an auxiliary resilient control arranged to act first in one direction to resist outward movement of the bob weights, and then in the opposite direction, said auxiliary control comprising a floating member rotatable bodily with the driving element, but capable of angular shift in relation thereto, coupling means between the bob weights and the floating member arranged automatically to impart angular shift as aforesaid to the floating member on outward or inward movement of the weights, a snap-over cam provided on the floating member to partake of its angular shift, and a spring-loaded cam follower bearing on the surface of the cam.

6. In a centrifugal clutch of the type described, the combination of a rotatable driving element, a plurality of bob weights rotatable with the driving element, a main resilient control for the bob weights comprising springs interconnecting said weights and arranged to resist outward movement of them, and an auxiliary resilient control arranged to act first in one direction to resist outward movement of the bob weights, and then in the opposite direction, said auxiliary control comprising a floating member rotatable bodily with the driving element but capable of angular shift in relation thereto, links coupling the bob weights with the floating member in such manner as automatically to impart angular shift as aforesaid to the floating member on outward or inward movement of the weights, a plurality of snap-over cams formed on the floating member, and a corresponding number of cam followers carried by the driving member and bearing on the surfaces of the cams.

7. In a centrifugal clutch of the type described, the combination of a rotatable driving element, a plurality of centrifugally-influenced bob weights rotatable with the driving element, a main resilient control for the bob weights comprising springs interconnecting said weights and arranged to resist outward movement of them, and an auxiliary resilient control arranged to act first in one direction to resist outward movement of the bob weights, and then in the opposite direction, said auxiliary control comprising a floating member rotatable bodily with the driving element but capable of angular shift in relation thereto, tooth-and-slot connections between the bob weights and the floating member arranged to impart angular shift as aforesaid to said member on outward and inward movement of the weights, at least one snap-over cam formed on the floating member, and at least one spring-loaded cam follower carried by the driving element and bearing on the surface of the cam.

8. In a centrifugal clutch of the type described, the combination of a rotatable driving element, a plurality of bob weights rotatable with the driving element, a main resilient control for the bob weights arranged to resist outward movement of them, and an auxiliary resilient control arranged to act first in one direction to resist outward movement of the bob weights, and then in the opposite direction, said auxiliary control comprising a floating member rotatable bodily with the driving element but capable of angular shift in relation thereto, tooth-and-slot coupling connections between the bob weights and the floating member arranged automatically to impart angular shift as aforesaid to the floating member on outward or inward movement of the weights, and to permit a certain degree of lost motion between the teeth and the slots, a snap-over cam provided on the floating member, a spring-loaded cam follower pivotally mounted on the driving element in such manner that centrifugal force would tend to move it out of engagement with the cam, and a trip device carried by the cam follower aforesaid and operable on movement of the follower away from the cam under centrifugal force to shift the floating member angularly to take up the lost motion between the tooth-and-slot connections between the bob weights of the floating member thereby simultaneously to move the dead centre of the cam past the follower.

9. In an automatically-acting centrifugal clutch in which engagement and disengagement of the clutch parts is effected by a rotatable member under the influence of centrifugal force, the combination of a casing, two plungers operable in opposite ends respectively of the casing, a single compression spring located within the casing and operable on both plungers simultaneously to urge them in a direction outwardly from the casing, a snap-over cam movable by the centrifugal member, a cam follower bearing on the surface of the cam and co-operating with one of the plungers aforesaid so that the latter acts first in one direction to resist outward movement of the centrifugal member and then in the opposite direction, directionally on the centrifugal member to resist its outward movement.

HENRY JOHN RICKWOOD.